Dec. 25, 1962   T. A. OLDFIELD   3,070,285
GAS TURBINE ENGINE
Filed Oct. 31, 1960   2 Sheets-Sheet 1

Thomas Alfred Oldfield
Inventor

By
Cushman, Darby & Cushman
Attorneys

United States Patent Office 3,070,285
Patented Dec. 25, 1962

3,070,285
GAS TURBINE ENGINE
Thomas Alfred Oldfield, Markeaton, Allestree, Derby, England, assignor to Rolls-Royce Limited, Derby, England, a company of Great Britain
Filed Oct. 31, 1960, Ser. No. 66,283
Claims priority, application Great Britain Nov. 26, 1959
4 Claims. (Cl. 230—116)

This invention concerns gas turbine engines.

According to the present invention there is provided a gas turbine engine comprising a fan unit which is mounted at the rear of the engine, said fan unit comprising a fan turbine driven by the propulsive gases of the engine, a fan turbine casing within which the fan turbine is mounted, a fan outer casing mounted about the fan turbine casing with an annular space therebetween, and fan rotor blading driven by said fan turbine and disposed in said annular space for drawing air therethrough, the fan turbine casing being formed as a load-carrying structure which supports both the fan turbine and the fan outer casing.

It will be appreciated that by virtue of forming the turbine casing as the said load-carrying structure, the fan casing may be made of light construction.

Preferably the said fan turbine is carried by or integral with an axially extending shaft member which is journalled within an axially extending sleeve, said sleeve being carried from the fan turbine casing by a plurality of angularly spaced apart struts which extend across the main annular fluid duct of the engine.

Each strut may be disposed within a fairing carried by said fan turbine casing.

The fan rotor blading may be integral with blades of the said fan turbine.

The said fan turbine may have more than one stage, the fan turbine blades being integral with the fan blading on at least one of said stages.

Figure 1:
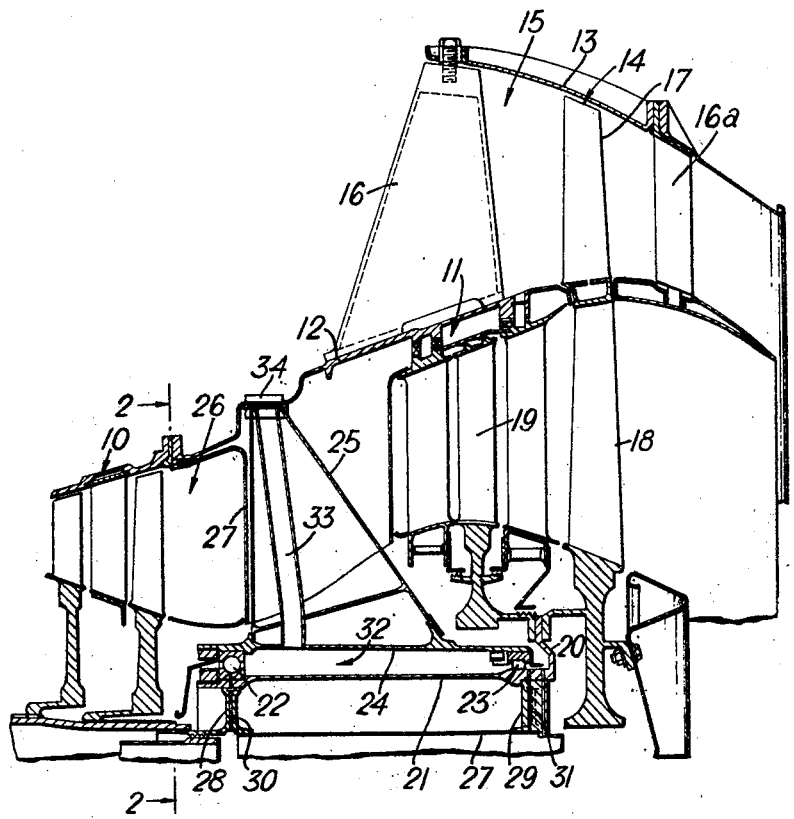
Figure 2:
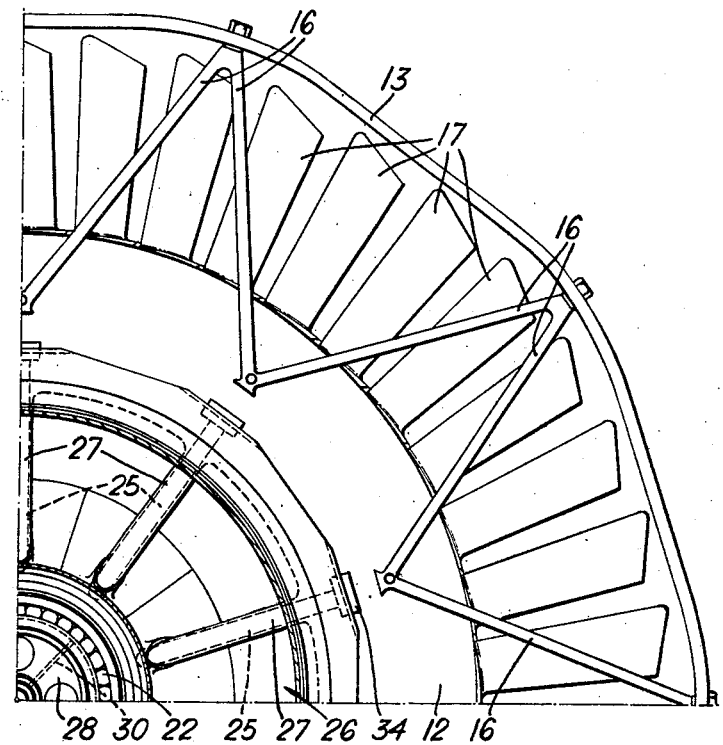

The invention is illustrated, merely by way of example, in the accompanying drawings, in which:

FIGURE 1 is a broken away sectional elevation of part of a gas turbine engine according to the present invention, and FIGURE 2 is a section taken on the line 2—2 of FIGURE 1.

Referring to the drawings, a gas turbine engine comprises high and low pressure turbines 10. Downstream of the turbines 10 is a fan turbine 11 which is driven by the propulsive gases of the engine. Mounted about the casing 12 of the fan turbine 11 is a fan casing 13. A fan unit 14 is disposed in the annular space 15 formed between the turbine casing 12 and the fan casing 13, the flow through the fan unit passing through the said annular space.

The turbine casing 12 is formed as a load-carrying structure which supports the fan casing 13 by way of inverted V-shaped struts 16 which extend across the annular space 15. Outlet guide vanes 16a are provided downstream of the fan unit 14 and they extend across the annular space 15.

The fan unit 14 comprises fan rotor blades 17 which are integral with the second stage blades 18 of the fan turbine 11. The second stage blades 18 and first stage blades 19 thereof are carried by a common rotor disc constituted by a radially outwardly extending flange 20 at the downstream end of a shaft 21.

The shaft 21 is journalled, by means of ball bearings 22 and roller bearings 23, within a sleeve 24. The sleeve 24 is supported from the load carrying turbine casing 12 by a plurality of radially extending strusts 25 which are spaced from each other by equal angular intervals. The struts 25 extend across the main annular fluid duct 26 of the engine, each of the struts 25 being disposed within a sheet metal fairing 27 to promote smooth aerodynamic flow of the gases through the duct 26. It will be appreciated that the propulsive gases passing through the duct 26 serve also to drive the fan turbine 11.

Concentrically mounted within the shaft 21 is a tube 27 which is spaced from the shaft 21 by annular discs, 28, 29. The latter are provided with radial drillings 30, 31 respectively which lead respectively to the ball bearings 22 and the roller bearings 23.

The tube 27 is arranged to receive a supply of lubricating oil which passes through the drillings 30, 31 to the bearings 22, 23 and so to an annular space 32 formed between the sleeve 24 and the shaft 21. Tubes 33, which are employed in the scavenging of a mixture of air and lubricating oil from the space 32, extend from the space 32 and pass through the interiors of the struts 25 to a manifold 34. The manifold 34, which is mounted externally of the casing 12 and is not shown in detail in the drawings, is so arranged that the mixture of air and lubricating oil which has passed via the tubes 33 to the manifold 34 is dumped overboard at a position clear of the intake to the fan unit 14.

Although the invention is illustrated as being applied to a fan unit horizontally disposed at the outlet of a horizontal gas turbine engine, the invention is also applicable to a vertically mounted fan unit disposed at the outlet of a vertically mounted gas turbine engine.

I claim:

1. A turbo-fan unit comprising fore and aft aligned inner casing sections spaced from one another by a circumferential gap, an outer casing surrounding and connected to both said fore and aft inner casing sections with an annular space therebetween, turbo-fan rotor means extending radially through said circumferential gap and having turbine blading and fan blading, said turbine blading being disposed inwardly of said fore and aft inner casing sections and said fan blading being disposed in said annular space, bearing means rotatably and solely supporting said turbo-fan rotor means, and means supporting said bearing means solely and directly from said fore inner casing section.

2. A turbo-fan unit comprising fore and aft aligned inner casing sections spaced from one another by a circumferential gap, an outer casing surrounding and connected to both said fore and aft inner casing sections with an annular space therebetween, turbo-fan rotor means extending radially through said circumferential gap and having turbine blading and fan blading, said turbine blading being disposed inwardly of said fore and aft inner casing sections and said fan blading being disposed in said annular space, a plurality of spaced struts connected to said fore inner casing section and extending inwardly thereof, and bearing means connected directly to and solely supported by said struts, said bearing means rotatably and solely supporting said turbo-fan rotor means.

3. A turbo-fan unit comprising fore and aft aligned inner casing sections spaced from one another by a circumferential gap, an outer casing surrounding and connected to both said fore and aft inner casing sections with an annular space therebetween, turbo-fan rotor means extending radially through said circumferential gap and having turbine blading and fan blading, said turbine blading being disposed inwardly of said fore and aft inner casing sections and said fan blading being disposed in said annular space, a plurality of spaced struts connected to said fore inner casing section and extending inwardly thereof, said struts being positioned upstream of said turbine blading, and bearing means connected directly to and solely supported by said struts, said bearing means rotatably and solely supporting said turbo-fan rotor means.

4. A turbo-fan unit comprising fore and aft aligned inner casing sections spaced from one another by a circumferential gap, and outer casing surrounding both said fore and aft inner casing sections with an annular space therebetween, a first set of spaced struts connecting said fore inner casing section to said outer casing, and a second set of spaced struts connecting said outer casing to said aft inner casing section, said first and second sets of struts being disposed respectively fore and aft of said circumferential gap, turbo-fan rotor means extending radially through said circumferential gap and having turbine blading and fan blading, said turbine blading being disposed inwardly of said fore and aft inner casing sections and said fan blading being disposed in said annular space, a third set of spaced struts connected to said fore inner casing section and extending inwardly thereof, and bearing means connected directly to and solely supported by said third set of struts, said bearing means rotatably and solely supporting said turbo-fan rotor means.

References Cited in the file of this patent
UNITED STATES PATENTS

| | | |
|---|---|---|
| 2,411,124 | Baumann | Nov. 12, 1946 |
| 2,692,724 | McLeod | Oct. 26, 1954 |
| 2,937,495 | Perry | May 24, 1960 |
| 2,961,150 | Pirtle | Nov. 22, 1960 |
| 2,999,631 | Wollmershauser | Sept. 12, 1961 |